United States Patent
Chen

(10) Patent No.: US 11,231,607 B2
(45) Date of Patent: Jan. 25, 2022

(54) DISPLAY PANEL LAMINATE STRUCTURE AND MANUFACTURING METHOD

(71) Applicant: HUIZHOU CHINA STAR OPTOELECTRONICS TECHNOLOGY CO., LTD., Huizhou (CN)

(72) Inventor: Chingyuan Chen, Huizhou (CN)

( * ) Notice: Subject to any disclaimer, the term of this patent is extended or adjusted under 35 U.S.C. 154(b) by 303 days.

(21) Appl. No.: 16/618,809

(22) PCT Filed: Nov. 4, 2019

(86) PCT No.: PCT/CN2019/115412
§ 371 (c)(1),
(2) Date: Dec. 3, 2019

(87) PCT Pub. No.: WO2020/238017
PCT Pub. Date: Dec. 3, 2020

(65) Prior Publication Data
US 2021/0364847 A1   Nov. 25, 2021

(30) Foreign Application Priority Data

May 29, 2019 (CN) .......................... 201910458558.7

(51) Int. Cl.
*G02F 1/1333*       (2006.01)
(52) U.S. Cl.
CPC .. *G02F 1/133325* (2021.01); *G02F 1/133331* (2021.01)

(58) Field of Classification Search
CPC combination set(s) only.
See application file for complete search history.

(56) References Cited

U.S. PATENT DOCUMENTS

| | | | |
|---|---|---|---|
| 9,811,188 B1* | 11/2017 | Subbarayan | G02F 1/1677 |
| 2014/0354937 A1* | 12/2014 | Moro | G02F 1/133308 |
| | | | 349/155 |
| 2015/0079379 A1* | 3/2015 | Suzuki | C09J 151/003 |
| | | | 428/220 |
| 2016/0070314 A1* | 3/2016 | Takahashi | G06F 1/1601 |
| | | | 361/679.21 |

FOREIGN PATENT DOCUMENTS

| | | |
|---|---|---|
| CN | 105158986 A | 12/2015 |
| CN | 107463063 A | 12/2017 |
| CN | 108469698 A | 8/2018 |
| CN | 109656062 A | 4/2019 |

* cited by examiner

*Primary Examiner* — Kevin Quarterman

(57) ABSTRACT

The present invention provides a display panel laminate structure and its manufacturing method. The display panel laminate structure includes a liquid crystal panel, a first support layer, a cover plate, a second support layer, and a sealant layer. The first support layer includes a first hollow portion, and a first medium is positioned in the first hollow portion. The second support layer includes a second hollow portion, and a second medium is positioned in the second hollow portion. A refractive index of the first medium and a refractive index of the second medium are both smaller than a refractive index of the sealant layer.

10 Claims, 2 Drawing Sheets

DISPLAY PANEL LAMINATE STRUCTURE AND MANUFACTURING METHOD

FIELD OF DISCLOSURE

The present invention relates to a field of display devices and in particular, to a display panel laminate structure and a manufacturing method.

DESCRIPTION OF RELATED ART

As people live a fast-paced lifestyle in this rapidly evolving information age, touch technology has gradually replaced traditional mice and keyboards due to its humanized design and simple and fast input, and is widely used in various electronic products. Display panels are widely used because of their fast response, high sensitivity, reliability, and durability.

Display panels mainly comprise liquid crystal display panels and glass cover plates.

In conventional techniques, the liquid crystal display panel and the glass cover plates are bonded together by using a sealant layer. Since an ink region is provided at a periphery of the glass cover plate, ultraviolet light cannot penetrate the ink region to cure the entire sealant layer along a vertical direction. Therefore, a side curing process is performed on lateral sides of the sealant layer by using ultraviolet (UV) light. When the side curing process is performed, since UV light can only penetrate to a limited depth, the sealant layer cannot be irradiated entirely, and the sealant layer is not completely cured, resulting in uneven attachment of the liquid crystal display panel to the glass cover plate, which is easy to cause problems such as wrinkles and uneven surfaces.

When the glass cover plate is thick or heavy, a wider sealant layer is required to attach the liquid crystal display panel to the cover glass plate, so a larger area of the sealant layer is not cured, and it is easy to cause uneven attachment of the liquid crystal display panel to the glass cover plate, resulting in problems such as wrinkles and uneven surfaces. Moreover, the liquid crystal display panel is likely to leak light at the wrinkles, and the liquid crystal display panel may be fragmented due to large wrinkles.

SUMMARY

The present invention provides a display panel laminate structure and a manufacturing method thereof, so as to solve a problem that ultraviolet (UV) light fails to completely cure a sealant layer, which leads to uneven attachment of a liquid crystal display panel to a glass cover plate, and causes wrinkles and uneven surfaces due to uneven attachment.

Accordingly, the present invention provides a display panel laminate structure and manufacturing method thereof. The display panel laminate structure comprises a liquid crystal panel, a first support layer, a first hollow portion, a cover plate, a second support layer, and a sealant layer. The first support layer is attached to an upper surface of a periphery of the liquid crystal panel. The first support layer comprises a first hollow portion, and a first medium is disposed in the first hollow portion. The cover plate is disposed corresponding to the liquid crystal panel. The second support layer is attached to a lower surface of a periphery of the cover plate. The second support layer comprises a second hollow portion, and a second medium is disposed in the second hollow portion. The sealant layer is attached to an upper surface of the first support layer, the second support layer is aligned with and attached to an upper surface of the sealant layer, and the first hollow portion and the second hollow portion are disposed at two sides of the sealant layer, respectively. A refractive index of the first medium and a refractive index of the second medium are both less than a refractive index of the sealant layer.

The first medium and the second medium are air, and the sealant layer is made of a solid adhesive.

The first support layer comprises a first annular portion and a second annular portion, the first annular portion is disposed on a periphery of an upper surface of the liquid crystal panel, and a second annular portion is disposed at a predetermined position on the upper surface of the liquid crystal panel, wherein the first hollow portion is defined between the first annular portion and the second annular portion.

The second support layer comprises a third annular portion and a fourth annular portion. The third annular portion is disposed on a periphery of a lower surface of the cover plate. The fourth annular portion is disposed at a predetermined position on the lower surface of the cover plate, wherein the second hollow portion is defined between the third annular portion and the fourth annular portion.

The sealant layer is ring-shaped.

A thickness of the first support layer and a thickness of the second support are both less than or equal to half a thickness of the sealant layer.

Accordingly, the present invention further provides a manufacturing method of a display panel laminate structure, comprising steps as follows:

a liquid crystal panel provision step, in which a first support layer is attached to an upper surface of a periphery of a liquid crystal panel, the first support layer comprises a first hollow portion, and a first medium is disposed in the first hollow portion;

a cover plate provision step, in which a second support layer is attached to a lower surface of a periphery of the cover plate, the second support layer comprises a second hollow portion, and a second medium is disposed in the second hollow portion;

a sealant layer provision step, in which a sealant layer is attached to an upper surface of the first support layer;

an aligned attachment step, in which the cover plate is aligned with and attached to the liquid crystal panel, so that the second support layer is aligned with and attached to an upper surface of the sealant layer, and the first hollow portion and the second hollow portion are disposed at two sides of the sealant layer respectively; and a curing step, in which a lateral side of the liquid crystal panel and a lateral side of the cover plate are irradiated by ultraviolet (UV) light to cure the sealant layer;

wherein a refractive index of the first medium and a refractive index of the second medium are both less than a refractive index of the sealant layer.

The first medium and the second medium are air, and the sealant layer is made of a solid adhesive.

The liquid crystal panel provision step comprises steps as follows:

a first annular portion provision step, in which a first annular portion is formed at a periphery of an upper surface of the liquid crystal panel; and a second annular portion provision step, in which the second annular portion is formed at a predetermined position on the upper surface of the liquid crystal panel;

wherein the first hollow portion is defined between the first annular portion and the second annular portion.

The cover plate provision step comprises steps as follows:

a third annular portion provision step, in which the third annular portion is disposed at a periphery of a lower surface of the cover plate; and a fourth annular portion provision step, in which the fourth annular portion is disposed at a predetermined position on the lower surface of the cover plate;

wherein the second hollow portion is defined between the third annular portion and the fourth annular portion.

Advantages of the Present Invention

In the display panel laminate structure, the hollow portions are disposed at two sides of the sealant layer. The refractive index of the sealant layer is greater than the refractive indices of the hollow portions. When a lateral side of the liquid crystal panel and a lateral side of the cover plate are irradiated by ultraviolent (UV) light, a portion of the UV light is reflected into the sealant layer to achieve total reflection, so that more UV light is transmitted in the sealant layer for a long distance by means of total reflection, the UV light is transmitted to a greater depth, and as a result, the entire sealant layer is cured to attach the liquid crystal panel to the cover plate in an even and flat manner, thus improving production yields of the display panel.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work or paying the premise.

DETAILED DESCRIPTION OF EMBODIMENTS

Example embodiments of the present invention are described below with reference to the accompanying drawings, which can fully describe technical contents of the present invention to persons of ordinary skills in the art for ease of understanding. However, the present invention may be embodied in various embodiments, and the protection scope of the present invention is not limited to the embodiments set forth herein.

Terms such as "first", "second", and the like (if any) in the specification, claims, and the accompanying drawings of the present invention are used to distinguish similar objects, and are not necessarily used to describe a particular order or sequence. It should be understood that the objects so described are interchangeable where appropriate. Moreover, terms such as "comprising" and "having" and the like are intended to cover a non-exclusive inclusion.

Figure 1:
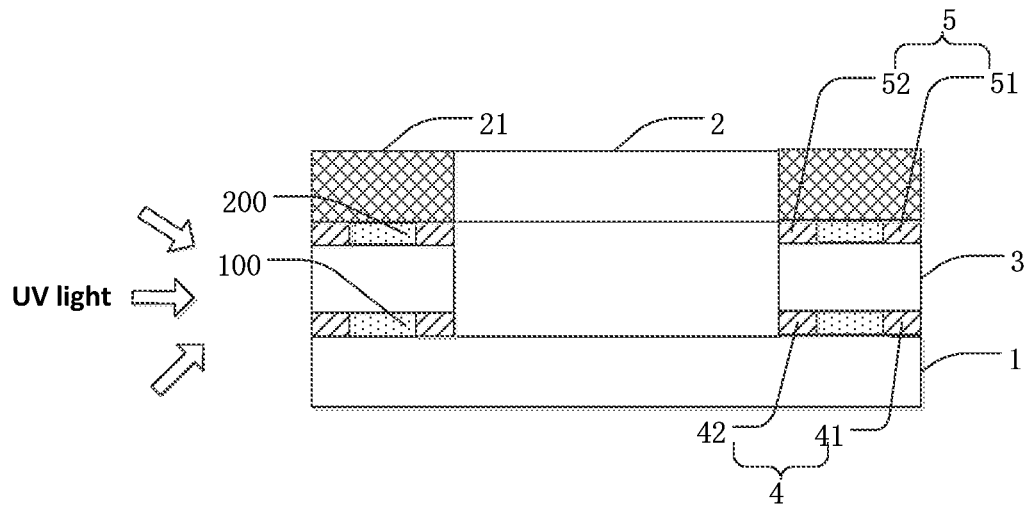
FIG. 1 is a schematic structural view illustrating a display panel laminate structure according to the present invention.

Referring to FIG. 1, the present embodiment provides a display panel which comprises a liquid crystal panel 1, a cover plate 2, a first support layer 4, a second support layer 5, and a sealant layer 3.

The liquid crystal panel 1 determines brightness, contrast, color, and viewing angles of a liquid crystal display.

The cover plate 2 is disposed corresponding to the liquid crystal panel 1. The cover plate 2 can be a glass plate. An ink region 21 is disposed at a periphery of the cover plate 2 to shield against light and prevent light leakage of the liquid crystal panel 1.

The cover plate 2 is disposed corresponding to the liquid crystal panel 1. The cover plate 2 can be a glass plate. An ink region 21 is disposed at a periphery of the cover plate 2 to function as a shield and prevent light leakage of the liquid crystal panel 1.

The sealant layer 3 is annular. The sealant layer 3 is disposed between the liquid crystal panel 1 and the cover plate 2 and arranged at peripheries of the liquid crystal panel 1 and the cover plate 2. The sealant layer 3 is made of a solid adhesive which is preferably a thermosetting adhesive or a hot-melt type ultraviolet (UV) glue and has advantages such as excellent optical performance, high bonding strength, excellent weather resistance, and non-yellowing. The sealant layer 3 can tightly bond the liquid crystal panel 1 to the cover plate 2. In the present embodiment, a refractive index of the sealant layer 3 preferably ranges from 1.3 to 1.8. In addition, those skilled in the art can adjust a width of the sealant layer 3 according to sizes of the liquid crystal panel 1 and the cover plate 2.

Figure 2:
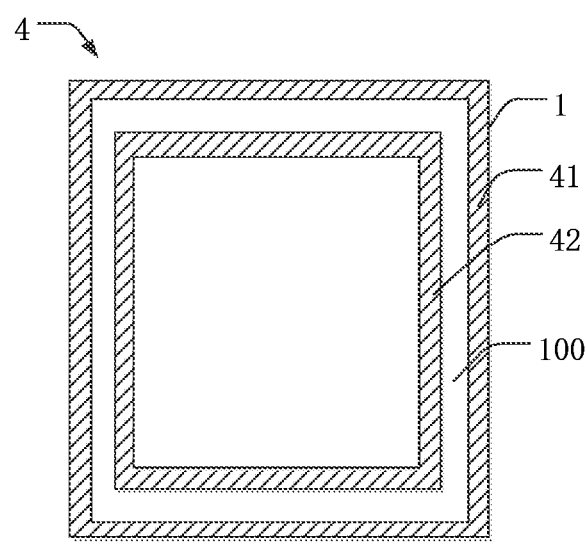
FIG. 2 is a schematic structural view illustrating a first support layer disposed on a liquid crystal panel according to the present invention.

As shown in FIG. 2, a first support layer 4 is attached to an upper surface of a periphery of the liquid crystal panel 1, the first support layer 4 comprises a first hollow portion 100, and a first medium is disposed in the first hollow portion 100. The first medium is air and has a refractive index of one.

The first support layer 4 comprises a first annular portion 41 and a second annular portion 42, the first annular portion 41 is disposed on a periphery of an upper surface of the liquid crystal panel 1, and a second annular portion 42 is disposed at a predetermined position on the upper surface of the liquid crystal panel 1, wherein the first hollow portion 100 is defined between the first annular portion 41 and the second annular portion 42.

The second support layer 5 is aligned with and attached to an upper surface of the sealant layer 3. Referring to FIG. 1, the second support layer 5 comprises a second hollow portion 200. A second medium is disposed in the second hollow portion 200. The second medium is air and has a refractive index of one.

The second support layer 5 comprises a third annular portion 51 and a fourth annular portion 52. The third annular portion 51 is disposed on a periphery of a lower surface of the cover plate 2. The fourth annular portion 52 is disposed at a predetermined position on the lower surface of the cover plate 2. The second hollow portion 200 is defined between the third annular portion 51 and the fourth annular portion 52.

The first hollow portion 100 and the second hollow portion 200 are disposed at two sides of the sealant layer 3. The first medium is disposed in the first hollow portion 100. The second medium is disposed in the second hollow portion 200. The refractive index of the first medium and the refractive index of the second medium are both less than a refractive index of the sealant layer 3. When a lateral side of the liquid crystal panel 1 and a lateral side of the cover plate 2 are irradiated by ultraviolent (UV) light, a portion of the UV light is reflected into the sealant layer 3 to achieve total reflection, so that more UV light is transmitted in the sealant layer for a long distance, and the UV light is transmitted to a greater depth, and as a result, the entire sealant layer 3 is cured to attach the liquid crystal panel 1 to the cover plate 2 in an even and flat manner, thus improving production yields of the display panel.

In the present embodiment, a thickness of the first supporting layer 4 and a thickness of the second supporting layer 5 are less than or equal to half of a thickness of the sealant layer 3. When the lateral sides of the liquid crystal panel 1 and the cover plate 2 are irradiated with UV light, the sealant layer 3 is cured.

During curing of the sealant layer 3, under a weight of the cover plate 2 and external forces, the sealant layer 3 absorbs UV light from UV light radiation to generate active free radicals or positive ions, which initiates monomers' polymerization, crosslinking and bonding. The first support layer 4 and the second support layer 5 are bonded to the sealant layer 3 for tight sealing, so that the liquid crystal panel 1 and the cover plate 2 are tightly attached to form a display panel. The display panel has advantages such as high brightness, full viewing angles, and fast response time. In the present embodiment, the external forces are applied to press the liquid crystal panel 1 and the cover plate 2 and bond them together, so that the liquid crystal panel 1 and the cover plate 2 are tightly attached together through the sealant layer 3. The present embodiment provides a display panel laminate structure, wherein the two hollow portions are disposed on two sides of the sealant layer, and the refractive index of the sealant layer is greater than the refractive index of each hollow portion. When lateral sides of the liquid crystal panel and the cover plate are irradiated by UV light, a portion of the UV light is reflected into the sealant layer when the UV light irradiates interfaces of the hollow portions from the sealant layer. Then, the UV light is propagated long distance in the sealant layer by means of total reflection, thereby increasing a cured area in lateral portions of the sealant layer, so that the liquid crystal panel and the cover plate are attached to each other without causing uneven surfaces, and production yields of the display panel are improved.

Figure 3:
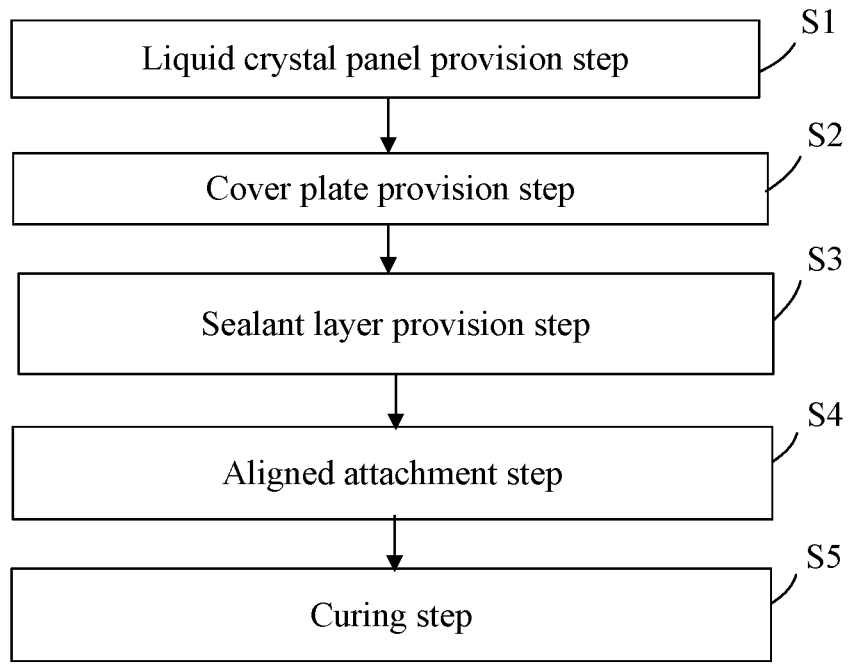
FIG. 3 is a process flow diagram illustrating a manufacturing method of the display panel laminate structure according to the present invention.

Referring to FIG. 3, the present embodiment further provides a manufacturing method of a display panel laminate structure, comprising steps S1 to S5.

Step S1: a liquid crystal panel provision step, in which a first support layer is attached to an upper surface of a periphery of a liquid crystal panel, the first support layer comprises a first hollow portion, and a first medium is disposed in the first hollow portion. The first medium is air and has a refractive index of one.

Figure 4:
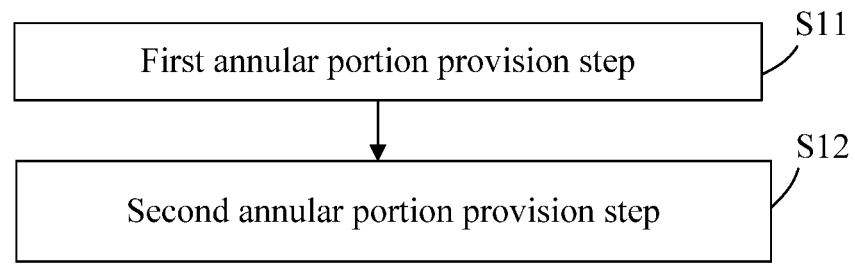
FIG. 4 is a process flow diagram illustrating a liquid crystal panel provision step according to the present invention.

Referring to FIG. 4, the liquid crystal panel provision step, step S1, comprises steps S11 and S12. In step S11, a first annular portion is formed at a periphery of an upper surface of the liquid crystal panel. In step S12, a second annular portion is formed at a predetermined position on the upper surface of the liquid crystal panel. The first hollow portion is defined between the first annular portion and the second annular portion.

Step S2: a cover plate provision step, in which a second support layer is attached to a lower surface of a periphery of the cover plate, the second support layer comprises a second hollow portion, and a second medium is disposed in the second hollow portion. The second medium is air and has a refractive index of one.

Figure 5:
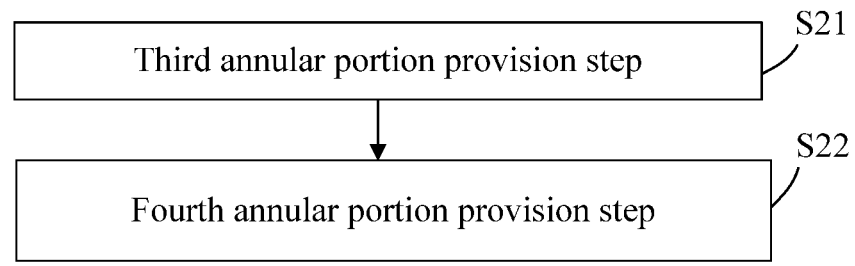
FIG. 5 is a process flow diagram illustrating a cover plate provision step according to the present invention.

Referring to FIG. 5, the cover plate provision step, step S2, comprises steps S21 and S22 as follows. In step S21, a third annular portion is disposed at a periphery of a lower surface of the cover plate. In step S22, a fourth annular portion is disposed at a predetermined position on the lower surface of the cover plate. The second hollow portion is defined between the third annular portion and the fourth annular portion.

Step S3: a sealant layer provision step, in which a sealant layer is attached to an upper surface of the first support layer. The sealant layer is composed of a solid adhesive. In the present embodiment, a refractive index of the sealant layer preferably ranges from 1.3 to 1.8. A person skilled in the art can adjust a width of the sealant layer according to sizes of the liquid crystal panel and the cover plate.

Step S4: an aligned attachment step, in which the cover plate is aligned with and attached to the liquid crystal panel through CCD (charge couple device) alignment, so that the second support layer is aligned with and attached to an upper surface of the sealant layer, and the first hollow portion and the second hollow portion are disposed at two sides of the sealant layer respectively.

Step S5: a curing step, in which a lateral side of the liquid crystal panel and a lateral side of the cover plate are irradiated by ultraviolet (UV) light to cure the sealant layer. The refractive index of the first medium and the refractive index of the second medium are both less than the refractive index of the sealant layer. When lateral sides of the liquid crystal panel and the cover plate are irradiated by UV light, a portion of the UV light is reflected into the sealant layer to achieve total reflection when the UV light irradiates interfaces of the first hollow portion or the second hollow portion from the sealant layer. Then, the UV light is propagated long distance in the sealant layer, and thereby the entire sealant layer can be cured, and the liquid crystal panel and the cover plate are attached to each other without causing uneven surfaces, thus improving production yields of the display panel.

A thickness of the first support layer and a thickness of the second support layer are less than or equal to half a thickness of the sealant layer. When the lateral sides of the liquid crystal panel and the cover plate are irradiated with UV light, the sealant layer is cured. During curing of the sealant layer 3, under a weight of the cover plate and external forces, the sealant layer absorbs UV light from UV light radiation to generate active free radicals or positive ions, which initiates monomers' polymerization, crosslinking, and bonding. The first support layer and the second support layer are bonded to the sealant layer for tight sealing, so that the liquid crystal panel and the cover plate are tightly attached to each other to form a display panel. The display panel has advantages such as high brightness, full viewing angles, and fast response time. In the present embodiment, the external forces are applied to press the liquid crystal panel and the cover plate and bond them together, so that the liquid crystal panel and the cover plate are tightly attached together through the sealant layer.

In the present embodiment, the liquid crystal panel provision step and the cover plate provision step can be executed in reverse order or can be performed simultaneously.

The present embodiment provides a display panel laminate structure, wherein two hollow portions are disposed on two sides of a sealant layer, and a refractive index of the sealant layer is greater than a refractive index of each hollow portion. When lateral sides of a liquid crystal panel and a cover plate are irradiated by UV light, a portion of the UV light is reflected into the sealant layer when the UV light irradiates interfaces of the hollow portions from the sealant layer. Then, the UV light is propagated long distance in the sealant layer by means of total reflection, and thereby the entire sealant layer can be cured, and the liquid crystal panel and the cover plate are attached without causing uneven surfaces, thus improving production yields of the display panel.

The above description only describes some embodiments of the present invention, and it should be noted that those skilled in the art can also make modifications and improvements without departing from the spirit of the present invention. Such modifications and improvements should also be considered to be within the protection scope of the present invention.

What is claimed is:

1. A display panel laminate structure, comprising:
   a liquid crystal panel;
   a first support layer attached to an upper surface of a periphery of the liquid crystal panel, the first support layer comprising a first hollow portion, wherein a first medium is disposed in the first hollow portion;
   a cover plate disposed corresponding to the liquid crystal panel;
   a second support layer attached to a lower surface of a periphery of the cover plate, the second support layer comprising a second hollow portion, wherein a second medium is disposed in the second hollow portion; and
   a sealant layer attached to an upper surface of the first support layer, the second support layer aligned with and attached to an upper surface of the sealant layer, the first hollow portion and the second hollow portion disposed at two sides of the sealant layer, respectively, wherein a refractive index of the first medium and a refractive index of the second medium are both less than a refractive index of the sealant layer.

2. The display panel laminate structure according to claim 1, wherein the first medium and the second medium are air, and the sealant layer is made of a solid adhesive.

3. The display panel laminate structure according to claim 1, wherein the first support layer comprises:
   a first annular portion disposed on a periphery of an upper surface of the liquid crystal panel; and
   a second annular portion disposed at a predetermined position on the upper surface of the liquid crystal panel;
   wherein the first hollow portion is defined between the first annular portion and the second annular portion.

4. The display panel laminate structure according to claim 1, wherein the second support layer comprises:
   a third annular portion disposed on a periphery of a lower surface of the cover plate; and
   a fourth annular portion disposed at a predetermined position on the lower surface of the cover plate;
   wherein the second hollow portion is defined between the third annular portion and the fourth annular portion.

5. The display panel laminate structure according to claim 1, wherein the sealant layer is ring-shaped.

6. The display panel laminate structure according to claim 1, wherein a thickness of the first support layer and a thickness of the second support layer are both less than or equal to half a thickness of the sealant layer.

7. A manufacturing method of a display panel laminate structure, comprising steps as follows:
   a liquid crystal panel provision step, in which a first support layer is attached to an upper surface of a periphery of a liquid crystal panel, the first support layer comprises a first hollow portion, and a first medium is disposed in the first hollow portion;
   a cover plate provision step, in which a second support layer is attached to a lower surface of a periphery of the cover plate, the second support layer comprises a second hollow portion, and a second medium is disposed in the second hollow portion;
   a sealant layer provision step, in which a sealant layer is attached to an upper surface of the first support layer;
   an aligned attachment step, in which the cover plate is aligned with and attached to the liquid crystal panel, so that the second support layer is aligned with and attached to an upper surface of the sealant layer, and the first hollow portion and the second hollow portion are disposed at two sides of the sealant layer respectively; and
   a curing step, in which a lateral side of the liquid crystal panel and a lateral side of the cover plate are irradiated by ultraviolet (UV) light to cure the sealant layer;
   wherein a refractive index of the first medium and a refractive index of the second medium are both less than a refractive index of the sealant layer.

8. The manufacturing method of the display panel laminate structure according to claim 7, wherein the first medium and the second medium are air, and the sealant layer is made of a solid adhesive.

9. The manufacturing method of the display panel laminate structure according to claim 7, wherein the liquid crystal panel provision step comprises steps as follows:
   a first annular portion provision step, in which a first annular portion is formed at a periphery of an upper surface of the liquid crystal panel; and
   a second annular portion provision step, in which the second annular portion is formed at a predetermined position on the upper surface of the liquid crystal panel;
   wherein the first hollow portion is defined between the first annular portion and the second annular portion.

10. The manufacturing method of the display panel laminate structure according to claim 7, wherein the cover plate provision step comprises steps as follows:
   a third annular portion provision step, in which the third annular portion is disposed at a periphery of a lower surface of the cover plate; and
   a fourth annular portion provision step, in which the fourth annular portion is disposed at a predetermined position on the lower surface of the cover plate;
   wherein the second hollow portion is defined between the third annular portion and the fourth annular portion.

* * * * *